United States Patent [19]
Cason et al.

[11] Patent Number: 5,902,095
[45] Date of Patent: May 11, 1999

[54] QUICK CHECK FAN SPEED INDICATOR

[76] Inventors: Anthony B. Cason, 1318 Alberta Dr., Forestville, Md. 20747; Welton Fields, Jr., 2314 Thorn Knoll Dr., Fort Washington, Md. 20744

[21] Appl. No.: 09/001,435

[22] Filed: Dec. 31, 1997

[51] Int. Cl.⁶ .................................................. F04B 49/00

[52] U.S. Cl. .......................... 417/63; 116/284; 116/285; 116/298; 116/309; 235/144 TP; 235/144 PN; 416/5; 416/61

[58] Field of Search ............................. 417/63; 116/298, 116/309, 284, 285, 317; 235/144 TP, 144 PN; 416/5, 61

[56] References Cited

U.S. PATENT DOCUMENTS

| | | | |
|---|---|---|---|
| 2,077,667 | 12/1937 | Spaunburg | 235/144 TP |
| 4,052,954 | 10/1977 | Roy | 116/124 |
| 4,675,663 | 6/1987 | Corwin | 340/671 |
| 4,762,463 | 8/1988 | Yang | 416/61 |
| 4,940,184 | 7/1990 | Smrt | 239/71 |

*Primary Examiner*—Charles G. Freay
*Assistant Examiner*—Paul L. Ratcliffe

[57] ABSTRACT

A fan speed indicator is provided including a conventional fan with a pull cord adapted to change a speed at which the fan is running upon being pulled. Further provided is mechanical mechanism for mechanically indicating the speed at which the fan is currently running.

10 Claims, 3 Drawing Sheets

QUICK CHECK FAN SPEED INDICATOR

BACKGROUND OF THE INVENTION

1. Field of the Invention

The present invention relates to electronic fan speed indicators and more particularly pertains to a new quick-check fan speed indicator for displaying a current fan speed with a mechanical fan speed indicator retrofitted to a bottom end of a pull cord of a conventional fan.

2. Description of the Prior Art

The use of electronic fan speed indicators is known in the prior art. More specifically, electronic fan speed indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art electronic fan speed indicators include U.S. Pat. No. 4,762,463; U.S. Pat. No. 4,675,663; U.S. Pat. No. 4,907,347; U.S. Pat. No. 4,899,050; U.S. Pat. No. 4,241,249; and U.S. Pat. Des. 349,859.

In these respects, the quick-check fan speed indicator according to the present invention substantially departs from the conventional concepts and designs of the prior art, and in so doing provides an apparatus primarily developed for the purpose of displaying a current fan speed with a mechanical fan speed indicator retrofitted to a bottom end of a pull cord of a conventional fan.

SUMMARY OF THE INVENTION

In view of the foregoing disadvantages inherent in the known types of electronic fan speed indicators now present in the prior art, the present invention provides a new quick-check fan speed indicator construction wherein the same can be utilized for displaying a current fan speed with a mechanical fan speed indicator retrofitted to a bottom end of a pull cord of a conventional fan.

The general purpose of the present invention, which will be described subsequently in greater detail, is to provide a new quick-check fan speed indicator apparatus and method which has many of the advantages of the electronic fan speed indicators mentioned heretofore and many novel features that result in a new quick-check fan speed indicator which is not anticipated, rendered obvious, suggested, or even implied by any of the prior art electronic fan speed indicators, either alone or in any combination thereof.

To attain this, the present invention generally comprises a housing having a rectangular configuration with a square top face, a square bottom face, and a periphery. Such periphery is defined by four rectangular side faces which form an interior space, as shown in FIGS. 1 & 2. The top face and bottom face each have a cylinder mounted thereon at a central extent thereof. The cylinder of the top face of the housing has a central aperture formed therein. The aperture resides in communication with the interior space of the housing. The cylinder of the bottom face has an eyelet formed in a bottom end thereof. The top face further has an annular lip depending therefrom within the interior space of the housing in concentric relationship with the aperture formed in the cylinder of the top face. The housing further includes a plurality of windows each mounted on a corresponding one of the side faces of the housing. The windows are square and preferably reside adjacent to the bottom face thereof for viewing the interior space of the housing. Also included is a bottom pull cord having a top end coupled to the eyelet of the cylinder of the bottom face of the housing. A bottom end of the bottom pull cord is equipped with a frusto-conical gripping member mounted thereon. Next provided is a lower gear assembly including an indicia disk rotatably coupled to the bottom face of the housing within the interior space thereof. Indicia is situated along a periphery thereof for viewing through the windows of the housing. The lower gear assembly further includes a first disk-shaped gear with a first diameter fixedly coupled in concentric relationship with the indicia disk atop thereof. The first disk-shaped gear is thus adapted for rotating coincidentally with the indicia disk. Associated therewith is an intermediate gear assembly including a second disk-shaped gear with a second diameter equal to the first diameter. The second disk-shaped gear is rotatably coupled adjacent to one of the side faces of the housing within the interior space thereof and in engagement with the first disk-shaped gear. The intermediate gear assembly further includes a cylinder-shaped ratchet wheel with a third diameter which is less than the second diameter. The cylinder-shaped ratchet wheel is rotatably coupled about an axis about which the second disk-shaped gear rotates. The second disk-shaped gear is further adapted to rotate coincidentally with the ratchet wheel. Finally, an upper assembly is provided including a cylinder slidably situated within the annular lip of the housing. As shown in FIG. 6, a post is fixed to a top face of the cylinder and extends upwardly through the aperture of the cylinder of the top face of the housing. Such post is connected to a top pull cord associated with a conventional fan. A coiled spring is situated about the post and between the cylinder and the top face of the housing for urging the same downwardly. Coupled to the cylinder and extended radially therefrom is a resilient pawl for engaging and rotating the ratchet wheel. Such is accomplished only upon the upward movement thereof within a slot formed in the annular lip of the housing. As such, the indicia disk is rotated to indicate the current speed at which it is running.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new quick-check fan speed indicator apparatus and method which has many of the advantages of the electronic fan speed indicators mentioned heretofore and many novel features that result in a new quick-check fan speed indicator which is not anticipated, rendered obvious, suggested, or even implied by any of the prior art electronic fan speed indicators, either alone or in any combination thereof.

It is another object of the present invention to provide a new quick-check fan speed indicator which may be easily and efficiently manufactured and marketed.

It is a further object of the present invention to provide a new quick-check fan speed indicator which is of a durable and reliable construction.

An even further object of the present invention is to provide a new quick-check fan speed indicator which is susceptible of a low cost of manufacture with regard to both materials and labor, and which accordingly is then susceptible of low prices of sale to the consuming public, thereby making such quick-check fan speed indicator economically available to the buying public.

Still yet another object of the present invention is to provide a new quick-check fan speed indicator which provides in the apparatuses and methods of the prior art some of the advantages thereof, while simultaneously overcoming some of the disadvantages normally associated therewith.

Still another object of the present invention is to provide a new quick-check fan speed indicator for displaying a current fan speed with a mechanical fan speed indicator retrofitted to a bottom end of a pull cord of a conventional fan.

Even still another object of the present invention is to provide a new quick-check fan speed indicator that includes a conventional fan with a pull cord adapted to change a speed at which the fan is running upon being pulled. Further provided is mechanical mechanism for mechanically indicating the speed at which the fan is currently running.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
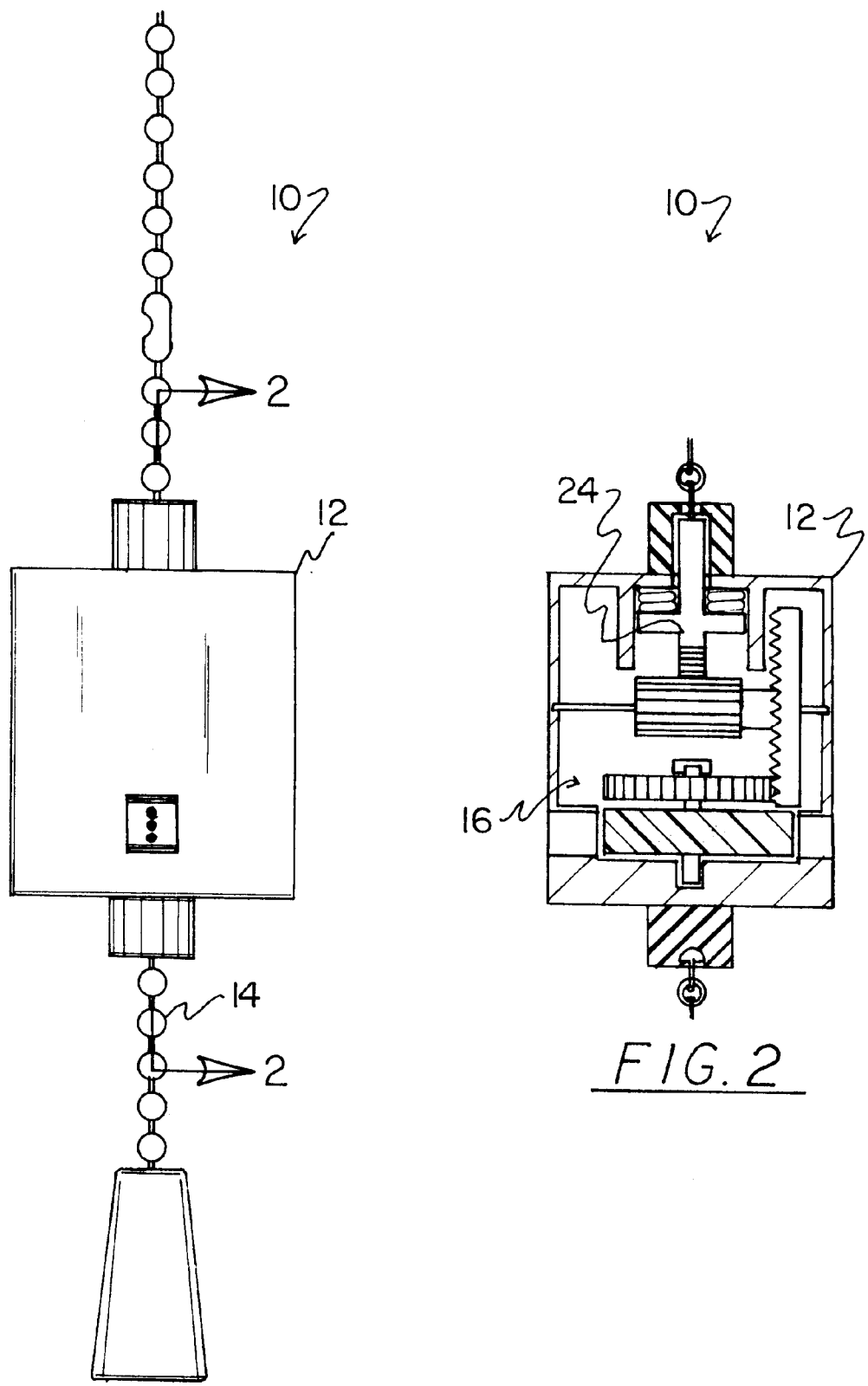
FIG. 1 is a side view of a new quick-check fan speed indicator according to the present invention.
FIG. 2 is a side cross-sectional view of an alternate embodiment of the present invention.
Figure 3:
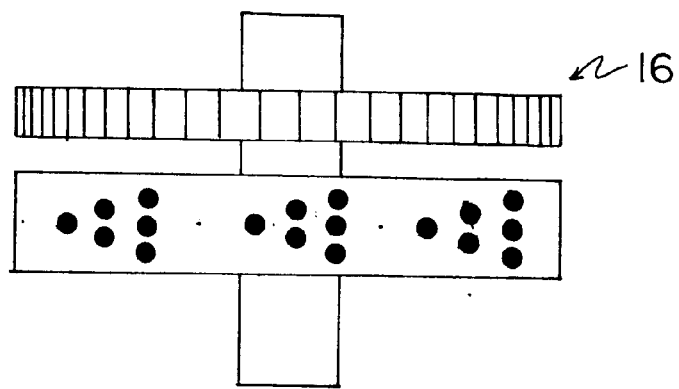
FIG. 3 is a side view of the lower gear assembly of the present invention.

With reference now to the drawings, and in particular to FIGS. 1 through 6 thereof, a new quick-check fan speed indicator embodying the principles and concepts of the present invention and generally designated by the reference numeral 10 will be described.

The present invention, designated as numeral 10, includes a housing 12 having a rectangular configuration with a square top face, a square bottom face, and a periphery. Such periphery is defined by four rectangular side faces which form an interior space, as shown in FIG. 1. The top face and bottom face each have a cylinder mounted thereon at a central extent thereof. The cylinder of the top face of the housing has a central aperture formed therein. The aperture resides in communication with the interior space of the housing.

The cylinder of the bottom face has an eyelet formed in a bottom end thereof. The top face further has an annular lip depending therefrom within the interior space of the housing in concentric relationship with the aperture formed in the cylinder of the top face. The housing further includes a plurality of windows each mounted on a corresponding one of the side faces of the housing. The windows are square and preferably reside adjacent to the bottom face of the housing for viewing the interior space of the housing.

Also included is a bottom pull cord 14 having a top end coupled to the eyelet of the cylinder of the bottom face of the housing. A bottom end of the bottom pull cord is equipped with a frusto-conical gripping member mounted thereon.

Next provided is a lower gear assembly 16 including an indicia disk rotatably coupled to the bottom face of the housing within the interior space thereof. The indicia disk rotates about a vertical axis. Indicia is situated along a periphery of the disk for viewing through the windows of the housing. In the preferred embodiment, the indicia includes a plurality of dots, slashes, or marks situated in a triangular configuration with a plurality of angularly spaced rows each having a unique number of dots or the like.

The lower gear assembly further includes a first disk-shaped gear with a first diameter fixedly coupled in concentric relationship with the indicia disk atop thereof. The first disk-shaped gear is thus adapted for rotating coincidentally with the indicia disk.

Associated therewith is an intermediate gear assembly 20 including a second disk-shaped gear with a second diameter equal to the first diameter. The second disk-shaped gear is rotatably coupled about a horizontal axis adjacent to one of the side faces of the housing within the interior space thereof and in engagement with the first disk-shaped gear.

The intermediate gear assembly further includes a cylinder-shaped ratchet wheel with a third diameter which is less than the second diameter. As shown in FIG. 2, a width of the ratchet wheel is greater than that of the disk-shaped gears. The cylinder-shaped ratchet wheel is rotatably coupled about an axis about which the second disk-shaped gear rotates. The ratchet wheel is further adapted to rotate coincidentally with the second disk-shaped gear.

Figure 6:
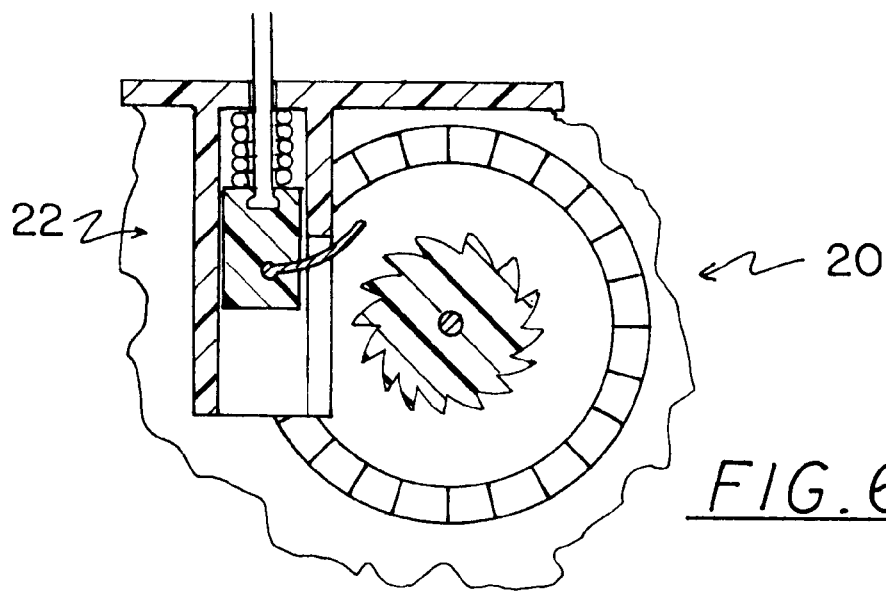
FIG. 6 is a side view of the upper assembly and intermediate gear assembly of the present invention.

Finally, an upper assembly 22 is provided including a cylinder slidably situated within the annular lip of the housing. As shown in FIG. 6, a post is fixed to a top face of the cylinder which extends upwardly through the aperture of the cylinder of the top face of the housing. Such post is connected to a top pull cord associated with a conventional fan. To accomplish such coupling, a clip is preferably utilized which is adapted to engage one of the balls of the top pull cord. A coiled spring is situated about the post between the cylinder and the top face of the housing for urging the same downwardly.

Coupled to the cylinder and extended radially therefrom is a resilient pawl for engaging and rotating the ratchet wheel. Such is accomplished only upon the upward movement thereof within a slot formed in the annular lip of the housing. As such, the indicia disk is rotated to indicate the current speed at which it is running.

Figure 4:
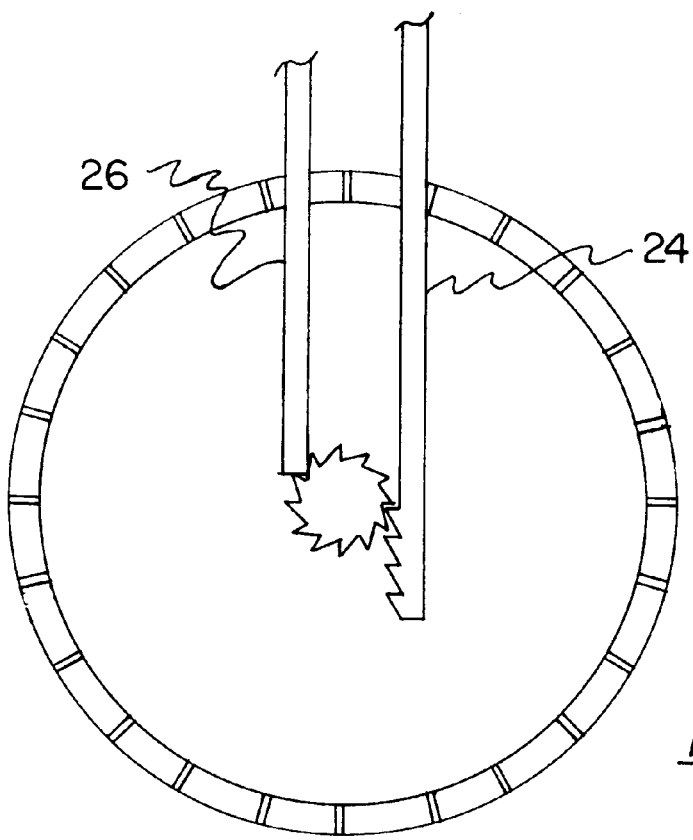
FIG. 4 is a side view of the upper assembly and intermediate gear assembly of the alternate embodiment of the present invention.
Figure 5:
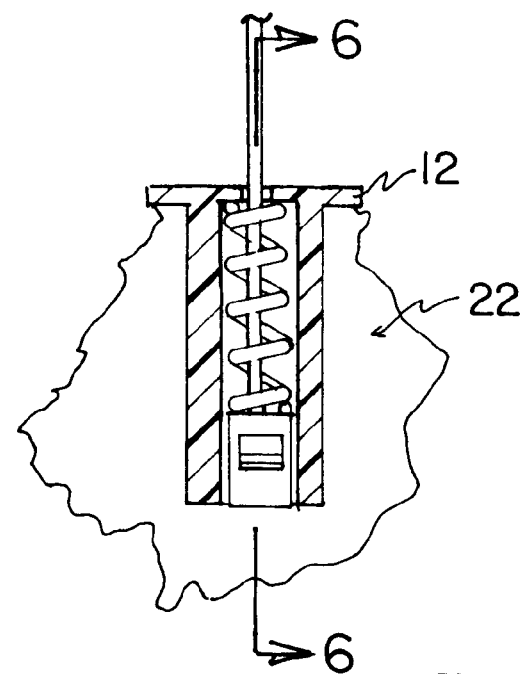
FIG. 5 is a side cross-sectional view of the upper assembly of the present invention.

In an alternate embodiment, the resilient pawl is replaced by a toothed ratchet member 24, as shown in FIGS. 2 & 4. In the present embodiment, a stopper 26 is provided for maintaining the current position of the indicia disk when the toothed ratchet moves upwardly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fan speed indicator comprising, in combination:

a housing having a rectangular configuration with a square top face, a square bottom face, and a periphery defined by four rectangular side faces thereby forming an interior space, the top face and bottom face each having a cylinder mounted thereon at a central extent thereof, the cylinder of the top face of the housing having a central aperture formed therein which resides in communication with the interior space of the housing, the cylinder of the bottom face having an eyelet formed in a bottom end thereof, the top face further having an annular lip depending therefrom within the interior space of the housing in concentric relationship with the aperture formed in the cylinder of the top face, the housing further including a plurality of windows each mounted on a corresponding one of the side faces of the housing adjacent to the bottom face thereof for viewing the interior space of the housing;

a bottom pull cord having a top end coupled to the eyelet of the cylinder of the bottom face of the housing and a bottom end with a frusto-conical gripping member mounted thereon;

a lower gear assembly including an indicia disk rotatably coupled to the bottom face of the housing within the interior space thereof with indicia situated along a periphery thereof for viewing through the windows of the housing, the lower gear assembly further including a first disk-shaped gear with a first diameter fixedly coupled in concentric relationship with the indicia disk atop thereof for rotating coincidentally therewith;

an intermediate gear assembly including a second disk-shaped gear with a second diameter equal to the first diameter, the second disk-shaped gear rotatably coupled adjacent to one of the side faces of the housing within the interior space thereof and in engagement with the first disk-shaped gear, the intermediate gear assembly further including a cylinder-shaped ratchet wheel with a third diameter which is less than the second diameter, the cylinder-shaped ratchet wheel rotatably coupled about an axis about which the second disk-shaped gear rotates and further adapted to rotate coincident therewith; and an upper assembly including a cylinder slidably situated within the annular lip of the housing, a post fixed to a top face of the cylinder and extending upwardly through the aperture of the cylinder of the top face of the housing and connected to a top pull cord associated with a conventional fan, a coiled spring situated about the post and between the cylinder and the top face of the housing for urging the same downwardly, and a resilient pawl coupled to the cylinder and extending radially therefrom for engaging and rotating the ratchet wheel only upon the upward movement thereof within a slot formed in the annular lip of the housing thereby rotating the indicia disk to indicate the current speed at which it is running.

2. A fan speed indicator comprising:

a conventional fan with a pull cord adapted to change a speed at which the fan is running upon the pulling thereof; and mechanical means for mechanically indicating the speed at which the fan is currently running.

3. A fan speed indicator as set forth in claim 2 wherein the mechanical means includes a disk with indicia formed about a periphery thereof.

4. A fan speed indicator as set forth in claim 2 wherein the mechanical means includes at least one gear assembly.

5. A fan speed indicator as set forth in claim 2 wherein the mechanical means includes a pawl.

6. A fan speed indicator as set forth in claim 2 wherein the mechanical means is situated within a housing mounted to a bottom end of the pull cord.

7. A fan speed indicator as set forth in claim 6 wherein the housing has another pull cord mounted to a bottom thereof.

8. A fan speed indicator as set forth in claim 2 wherein the mechanical means is spring loaded.

9. A fan speed indicator comprising:

a conventional fan with a pull cord adapted to change a speed at which the fan is running upon the pulling thereof; and means for indicating the speed at which the fan is currently running;

said means being situated within a housing mounted to a bottom end of the pull cord.

10. A fan speed indicator as set forth in claim 9 wherein the housing has another pull cord mounted to a bottom thereof.

* * * * *